Sept. 4, 1951 M. CAMRAS 2,566,441

MAGNETIC RECORD MEDIUM AND METHOD OF MAKING THE SAME

Filed April 29, 1946

Inventor
MARVIN CAMRAS by The Firm of Charles W. Hills Attys.

Patented Sept. 4, 1951

2,566,441

UNITED STATES PATENT OFFICE 2,566,441

MAGNETIC RECORD MEDIUM AND METHOD OF MAKING THE SAME

Marvin Camras, Chicago, Ill., assignor to Armour Research Foundation of Illinois Institute of Technology, Chicago, Ill., a corporation of Illinois Application April 29, 1946, Serial No. 665,883

4 Claims. (Cl. 18—47.5)

This invention relates to a magnetic record medium and more particularly to a record member which is particularly suited for use in magnetic recording and reproducing devices.

In the magnetic recording and reproduction of sound and other fluctuating signal energy, a traveling magnetizable record member is employed. Such a record member should have a high coercive force and a relatively high tensile strength. In the past magnetic record members have usually been formed of steel, although record members have also been employed wherein a moving picture film has been used as a carrier for magnetizable powder that has been coated on the surface of the film. Paper tapes have also been employed in which magnetizable powder has been coated onto the surface of the paper.

According to the present invention, a novel magnetic record member for magnetic recording (and this term will be used throughout this application to designate either a magnetic recorder or a magnetic reproducer, or both) is provided in the form of a filament or strand of synthetic resinous material characterized by "elastic memory" and having a finely divided permanent magnet material incorporated therewith.

The above disclosed resinous materials are high polymeric materials and include superpolyamides, such as nylon (polyhexamethylenediadipamide), "Saran" (polyvinylidene chloride), polystyrene, polyethylene, copolymers of vinyl chloride and vinyl acetate, superpolyesters such as polymethylene glycol sebacate, polyvinyl chloride and like high polymers that can be stretched by a cold drawing process into an extended shape retained at ordinary temperatures but reverting to their original dimensions at an elevated temperature below the softening point. Such cold drawing is believed to involve an orientation of the molecules comprising the high polymer material and serves to increase the tensile strength of filaments or tape made up of the oriented polymer material. Such high polymeric resinous material is herein referred to generically as having an "elastic memory."

The magnetic record members according to the present invention are made from the above disclosed high polymeric material by an extrusion process. The extruded material may be a suitable solution of the high polymeric material or molten high polymeric material. The finely divided magnetic material may be dispersed in a liquid material being extruded, to form a strand or filament having the magnetic material distributed uniformly throughout the filament or strand, or else the high polymeric material may be extruded in the form of a tube surrounding a simultaneously extruded core made up of finely divided magnetic material, preferably held together by additional high polymeric material. It is also possible to extrude a core of high polymeric material and simultaneously or subsequently to coat this core with finely divided magnetic material adhesively bonded to the core by means of an additional amount of high polymeric material to form a tubular film or coating over the core.

The extruded material having the magnetic material uniformly distributed throughout its body or concentrated either in a core or in a tubular surface layer, is next stretched, say, by from 400 to 700%, as by unwinding from a slowly rotating bobbin onto a more rapidly rotating bobbin. The stretching may be accompanied by drawing through a suitable die, for conferring on the stretched filament a uniform diameter and a smooth finish. Such die drawing is particularly applicable to magnetic record members prepared by surface coating a high polymeric core with a resinous composition containing finely divided magnetic material.

The finely divided magnetic material incorporated in the magnetic record members above disclosed may consist of any permanent magnet material, but preferably consists of permanent magnet material characterized by a large coercive force such as the recently developed aluminum-nickel-iron and aluminum-nickel-cobalt alloys. These permanent magnet alloys are generally characterized by such a high brittleness that they cannot be drawn, so that the present invention offers for the first time a magnetic record member comprising such permanent magnet material of high coercive force.

It is therefore an important object of the present invention to provide a novel magnetic record member comprising discrete particles of permanent magnet material.

Another important object of the present invention is to provide a novel magnetic record member of the type indicated in the preceding paragraph comprising cold drawn high polymeric resinous material having an "elastic memory" in tubular or filament form for the purpose of conferring high tensile strength on the record member.

A further object of the present invention is to provide a novel composite magnetic record member characterized by high tensile strength and high coercive force and including cold drawn high polymeric resinous material characterized by "elastic memory" together with discrete particles of permanent magnet material of high coercive force associated with the resinous material.

Still another object of the present invention is to provide methods for making novel magnetic record members of the type indicated including an initial extrusion step followed by a cold drawing or stretching step.

Other and further objects and features of the present invention will become apparent from the following description and appended claims and from the attached drawings, which show, diagrammatically and by way of example, three forms of magnetic record members according to the present invention. More particularly:

Figure 1:
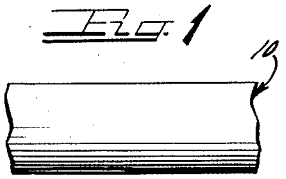
Figure 1 is a fragmentary side elevation of a record member having magnetic material distributed throughout its body, before the cold drawing step.
Figure 2:
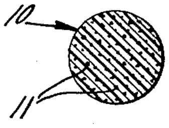
Figure 2 is a vertical transverse cross-sectional view through the structure of Figure 1.

The preparation of the structures of Figures 1 to 12 is described hereinbelow as carried out with polyvinylidine chloride such as "Saran." This material is melted and suitable finely divided magnetic material is thoroughly intermixed therewith. The resulting mixture is extruded through a suitable die in the form of a filament into a water bath maintained at a temperature sufficiently low (normally about 50° F.) so that crystallization will not be started. A strand of amorphous supercooled Saran will then be obtained. Such a strand is illustrated in Figures 1 and 2 and there indicated generally by the reference numeral 10. As shown in Figure 2, a large number of fine particles 11 of magnetic material are distributed uniformly throughout the cross section of the strand. The strand 10 is drawn away from the die through the water bath at a uniform rate by means of a set of snubbing or takeoff rolls which are positively driven so that a uniform cross section may be obtained. The strand of Saran is then passed to a set of orienting rolls which may be driven from the takeoff rolls through a friction clutch. The free speed of the orienting rolls is approximately 660% of the takeoff speed of the roll mechanism. As the material is placed on the orienting rolls, the clutch slips to such an extent that complete orientation or stretching is obtained. The force required for orientation varies with the size of the section and with the temperature of the supercooled strand. The stretching force may be varied by altering the tension on the orienting roll friction clutch so that sections of various sizes may be accommodated. The slip in the friction clutch under normal operating conditions is such that complete orientation (approximately 400% stretch) is obtained. The high tensile strength of oriented Saran is developed through this stretching. Higher strengths are obtained in smaller strands due to more thorough supercooling of the material during the quenching operation. After orientation, the strand is taken away by suitable wind-up or reeling equipment.

Figure 3:
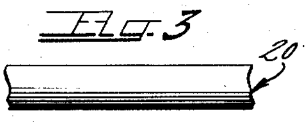
Figure 3 is a side elevational view of the record member of Figure 1 after stretching.
Figure 4:
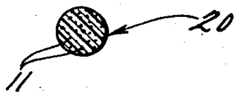
Figure 4 is a vertical transverse cross-sectional view through the record member of Figure 3.

The stretched strand is illustrated in Figures 3 and 4 and there indicated generally by the reference numeral 20. As shown in Figure 4, the cross-sectional area of the strand has been reduced approximately to one-quarter of the original cross-sectional area. The number of magnetic particles 11 exposed in any one transverse cross-sectional area has been reduced to about 25% of those exposed in the cross section of the unstretched strand, due to rearrangement of the particles on stretching of the strand 10.

In place of polyvinylidine chloride, other high polymer material such as super polyamides (nylon) may be used.

The finely divided magnetic material may consist of any ferromagnetic substance, such as steel, stainless steel, ferromagnetic nickel alloys, ferromagnetic oxides of iron and cobalt such as magnetite ferromagnetic aluminum-nickel-cobalt alloys and the like. Preferably the ferromagnetic material should consist of very fine particles, for instance, 200 mesh or smaller. A single particle of such fine material will not occupy a very large fraction of the cross section of even a very fine filament, and consequently will not lessen the tensile strength of the filament at any particular point. Further, the use of very finely divided magnetic material will insure uniform magnetic properties along the length of the filament.

The final thread should preferably have a diameter on the order of 4 or 5 mils. However, the extruded filament, before stretching, may have double this diameter, which is then reduced by 50% on stretching.

When solutions of high polymeric materials are extruded, for instance, a 25% acetone solution of the copolymer of vinyl acetate and vinyl chloride, the shrinking on evaporation of the solvent after extrusion enables us to produce quite thin filaments.

On stretching, the cross-sectional area of the high polymeric material is reduced, but the ferromagnetic particles are not compressible, so that the reduction in cross-sectional area is confined to the high polymeric resinous material. Hence, the particles of ferromagnetic material are firmly gripped and held by the high polymeric plastic material. Further, the rearrangement of the ferromagnetic particles occurring on stretching tends to arrange the ferromagnetic particles orderly along the length of the stretched filament, thereby insuring uniform magnetic properties along the length of the material as well as transversely of the filaments.

Figure 5:
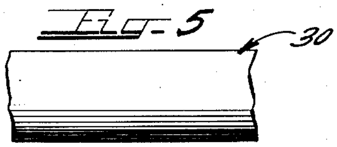
Figure 5 is a fragmentary side elevational view of another magnetic record member having a core containing permanent magnet material enclosed by a larger tubular covering made up of high polymeric resinous material, before being cold drawn.
Figure 6:
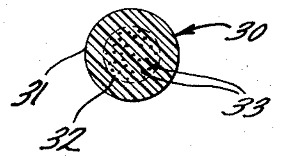
Figure 6 is a vertical transverse cross-sectional view through the magnetic record member of Figure 5.
Figure 7:
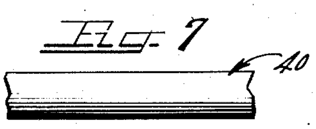
Figure 7 is a side elevational view of the magnetic record member of Figure 5 after cold drawing.
Figure 8:
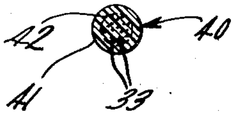
Figure 8 is a vertical transverse cross-sectional view through the magnetic record member of Figure 7.
Figure 9:
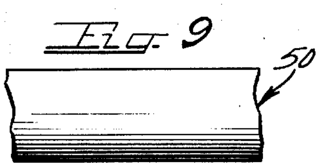
Figure 9 is a fragmentary side elevational view of a third magnetic record member having a core of high polymeric resinous material enclosed by an outer covering containing permanent magnet material, before cold drawing.
Figure 10:
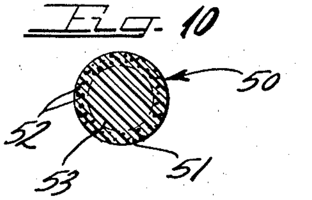
Figure 10 is a vertical transverse cross-sectional view through the magnetic record member of Figure 9.
Figure 11:
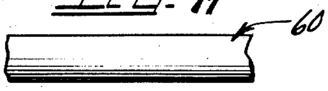
Figure 11 is a side elevational view of the magnetic record member of Figure 9 after cold drawing.
Figure 12:
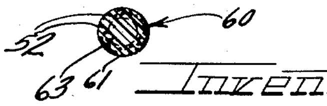
Figure 12 is a vertical transverse cross-sectional view through the magnetic record member of Figure 11.

In Figures 5 to 8, I have illustrated another form of the magnetic record member of the present invention. As shown in Figures 5 and 6, I extrude a strand indicated generally by the reference numeral 30 and composed of an outer layer 31 of high polymeric plastic material together with an inner core 32 made up of finely divided ferromagnetic particles 33 adhered together more or less firmly by additional amount of high polymeric material. Preferably, the tubular outer layer 31 is extruded (by conventional apparatus) about the core 32 which is fed into the tubular layer 31 as the latter is being extruded. After extrusion, the cored filament 30 is stretched, say, by from 400 to 700%, to yield a final record member indicated generally in Figures 7 and 8 by the reference numeral 40 and including an outer tubular sheath or covering 41 enclosing a central core 42 made up of the fine ferromagnetic particles 33 bonded together more or less firmly by high polymeric resinous material. In the filament of Figures 7 and 8, the outer tubular sheath 41 (made up more or less exclusively of high polymeric material) contributes high tensile strength and makes possible a high concentration of ferromagnetic material in the core 42. The relative small cross-sectional area of the core 42 and the high concentration of ferromagnetic material therein enhances the uniformity of the filament along its length with respect to magnetic properties.

In Figures 9 to 12, I have shown still another magnetic record member according to the present invention. In preparing this record member, I may extrude the structure indicated generally in Figures 9 and 10 by the reference numeral 50 and including a core 53 made up of high polymeric resinous material together with an outer tubular sheath or covering 51 also comprising high polymeric resinous material and having fine particles 52 of ferromagnetic material embedded therein. Alternatively, I can extrude the central core 53 and subsequently coat the core with high polymeric plastic material in liquid form (melted or dissolved) having finely divided ferromagnetic material suspended therein. The member 50, however prepared, is finally stretched to yield the record member indicated generally in Figures 11 and 12 by the reference numeral 60 and including a central core 63 made up of high polymeric resinous material enclosed by an outer tubular sheath or layer 61 having ferromagnetic particles 52 embedded therein.

If desired, the extruded filament, when being stretched, can be passed through appropriately apertured drawing dies for reducing the cross-sectional area of the filament and for insuring uniform cross-sectional configuration of the filament.

It will thus be seen that I have provided a novel magnetic record member comprising finely divided ferromagnetic particles held together by high polymeric resinous material having "elastic memory" in the form of a filament or strand. As disclosed, the ferromagnetic particles may be distributed uniformly throughout the cross section of such a filament or strand, or may be concentrated either in the center thereof as a core or in a tubular outer layer covering a central core made up of high polymeric resinous material. Such strands, especially those having the ferromagnetic material distributed uniformly throughout the transverse cross section, may be prepared in the form of very fine filaments having diameters as small as 1.5 mils. Many details of composition, structure and procedure may be varied within a wide range without departing from the principles of this invention, and it is therefore not my purpose to limit the claims granted on this invention otherwise than necessitated by the scope of the appended claims.

I claim as my invention:

1. A magnetic record member comprising a solid homogeneous filamentary core of high polymeric resinous material and a sheath of high polymeric resinous material completely surrounding said core, said sheath containing magnetic particles of relatively high coercive force ferromagnetic material uniformly dispersed therein, the outer surface of said member being relatively smooth and free from surface irregularities.

2. A magnetic record member comprising a solid homogeneous filamentary core of high polymeric resinous material and a sheath of high polymeric resinous material completely surrounding said core, said sheath containing magnetic particles of relatively high coercive force ferromagnetic material uniformly dispersed therein, the outer surface of said member being relatively smooth and free from surface irregularities, the magnetic record member having an outer diameter on the order of 4 mils.

3. The method of making a magnetic record member which comprises extruding a solid filamentary core of high polymeric resinous material, providing a sheath of high polymeric resinous material containing finely divided particles of relatively high coercive force completely about said core, and simultaneously stretching said sheath and core while drawing the member through a die to remove surface irregularities.

4. The method of making a magnetic record member which comprises extruding a solid filamentary core of high polymeric resinous material, providing a sheath of high polymeric resinous material containing finely divided ferromagnetic particles of relatively high coercive force completely about said core, and simultaneously stretching said sheath and core while drawing the stretched member through a die to remove surface irregularities, said stretching and drawing being carried out until the record member has an outer diameter on the order of 4 mils.

MARVIN CAMRAS.

REFERENCES CITED

The following references are of record in the file of this patent:

UNITED STATES PATENTS

| Number | Name | Date |
|---|---|---|
| 1,883,562 | Chipman et al. | Oct. 18, 1932 |
| 1,912,887 | Chipman | June 6, 1933 |
| 1,949,840 | Languepin | Mar. 6, 1934 |
| 2,074,285 | Studt et al. | Mar. 16, 1937 |
| 2,199,526 | McCowen | May 7, 1940 |
| 2,229,293 | Huntley et al. | Jan. 21, 1941 |
| 2,238,694 | Graves | Apr. 15, 1941 |
| 2,418,479 | Pratt et al. | Apr. 8, 1947 |

FOREIGN PATENTS

| Number | Country | Date |
|---|---|---|
| 177,647 | Switzerland | June 15, 1935 |